US008289337B2

(12) United States Patent
Yang et al.

(10) Patent No.: US 8,289,337 B2
(45) Date of Patent: Oct. 16, 2012

(54) METHOD FOR PROCESSING DISPLAY DATA

(75) Inventors: Yu-Hsien Yang, Hsin-Chu (TW); Jih-Sheng Chen, Hsin-Chu (TW); Yu-Hsi Ho, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 806 days.

(21) Appl. No.: 12/421,818

(22) Filed: Apr. 10, 2009

(65) Prior Publication Data

US 2009/0256850 A1 Oct. 15, 2009

(30) Foreign Application Priority Data

Apr. 11, 2008 (TW) .............................. 97113373 A

(51) Int. Cl.
*G06F 13/00* (2006.01)

(52) U.S. Cl. ....................................... 345/536; 345/537

(58) Field of Classification Search .................. 345/536, 345/537

See application file for complete search history.

(56) References Cited

U.S. PATENT DOCUMENTS 5,771,031 A 6/1998 Kinoshita et al.
2002/0130881 A1 9/2002 Kudo et al.

*Primary Examiner* — Maurice L McDowell, Jr.
(74) *Attorney, Agent, or Firm* — Chun-Ming Shih

(57) ABSTRACT

A method for processing display data includes: storing an image data in a plurality of first-type memories by taking scanning line data as a unit; providing one of the scanning line data stored in a particular memory of the first-type memories to one of a plurality of second-type memories, the particular memory being one of the first-type memories, which are not receiving and storing the image data; and outputting the scanning line data stored in the second-type memories. Time periods for outputting the scanning line data of the image data from the second-type memories are not overlapped.

20 Claims, 8 Drawing Sheets

METHOD FOR PROCESSING DISPLAY DATA

CROSS-REFERENCE TO RELATED APPLICATIONS

This application is based upon and claims the benefit of priority from the prior Taiwanese Patent Application No. 097113373, filed Apr. 11, 2008, the entire contents of which are incorporated herein by reference.

BACKGROUND

1. Field of the Invention

The present invention relates to a method for processing display data, and more particularly, to a method for processing display data, which employs scanning lines as processing units.

2. Description of the Related Art

With wide use of various displays in daily life, users are not satisfied to transmit information only by images. There is a further need to improve the quality of the images. To improve the quality of the images, it should increase scanning frequencies of the displays. However, with increasing the scanning frequencies of the displays, data needed to be processed in a predetermined time period are increased doubly. Thus it will largely increase the amount of data memories for the images.

Generally, there should be more input ports than output ports when processing images (for example the amount of input ports is double that of the output ports, that is including four input ports and two output ports), such that a time period for receiving data is double that for sending out the data. Because of the time relation between inputting/outputting, a conventional technology employs three groups of double data rate random access memories (DDRRAM) as a storing space for display data.

Referring to FIG. 1, a sequence diagram of a conventional method for processing image data is provided. As shown in FIG. 1, the image data are continuously inputted into DDRRAM of an image buffer. Time periods are in relation to the DDRRAM and the sequence for the data in here. For example, DDR1_W1 are first image data written into a first group of DDRRAM; DDR2_W1 are first image data written into a second group of DDRRAM; and DDR3_W1 are first image data written into a third group of DDRRAM. Furthermore, DDR1_W2 are second image data written into the first group of DDRRAM; DDR2_W2 are second image data written into the second group of DDRRAM; and DDR3_W2 are second image data written into the third group of DDRRAM.

As shown in FIG. 1, in the time period DDR1_W1, a group of image data are written into the first group of DDRRAM. After the time period DDR1_W1, that is, after the first group of DDRRAM receives the group of image data, the first group of DDRRAM begins to output the image data stored therein to another buffer (called as display buffer in following) for being displayed in a display. The output performance operates in the time period DDR1_R1 as shown in FIG. 1. Similarly, in the time period DDR2_W1, another group of image data are written into the second group of DDRRAM. After the time period DDR2_W1, the second group of DDRRAM outputs the image data stored therein to the display buffer in the time period DDR2_R1 as shown in FIG. 1. In addition, in the time period DDR3_W1, other group of image data are written into the third group of DDRRAM. After the time period DDR3_W1, the third group of DDRRAM outputs the image data stored therein to the display buffer in the time period DDR3_R1.

From FIG. 1, it is obvious that three groups of DDRRAMs must be employed to successfully input and output the data in the condition that the amount of the input ports is double that of the output ports. Thus the manufacturers seek methods for decreasing the manufacturing cost in the modern society with the keen competition and the gradual increasing material cost. However, the manufacturers are limited by the above design, and cannot find an excellent reformative method.

What is needed, is providing a method for processing image data, which can solve the above problems.

SUMMARY OF THE INVENTION

A method for processing display data in accordance with an exemplary embodiment of the present invention is provided. The method is adapted into a display to scan a plurality of scanning lines just one time for displaying an image data. The image data comprises a plurality of scanning line data, and each scanning line data is configured for displaying on one corresponding scanning line. The method comprising: storing the image data in a plurality of first-type memories by taking one scanning line data as a unit; providing one of the scanning line data stored in a particular memory of the first-type memories to one of a plurality of second-type memories, the particular memory being one of the first-type memories, which are not receiving and storing the image data; and outputting the scanning line data stored in the second-type memories. Time periods for outputting the scanning line data of the image data from the second-type memories are not overlapped.

A method for processing display data in accordance with another exemplary embodiment of the present invention is provided. The method is adapted to a display having an image buffer and a scanning line data buffer. The image buffer includes a plurality of first-type memories, and the scanning line data buffer includes a plurality of second-type memories. The method comprises: storing a first scanning line data in a first particular memory of the first-type memories; storing a second scanning line data in a second particular memory of the first-type memories; providing the first scanning line data from the first particular memory of the first-type memories to a first particular memory of the second-type memories; providing the second scanning line data from the second particular memory of the first-type memories to a second particular memory of the second-type memories; and, when the first scanning line data and the second scanning line data are included in a same frame, outputting the first scanning line data stored in the first particular memory of the second-type memories and the second scanning line data stored in the second particular memory of the second-type memories such that the output first scanning line data and second scanning line data are not overlap.

A method for processing display data in accordance with other exemplary embodiment of the present invention is provided. The method is adapted to a display having an image buffer and a scanning line data buffer. The method comprises: storing a first scanning line data and a second scanning line data in the image buffer; reading out the first scanning line data from the image buffer in a first time period, and starting to write the first scanning line data into the scanning line data buffer in the first time period; outputting the first scanning line data form the scanning line data buffer in a second time period; and reading out the second scanning line data from the image buffer in a third time period, starting to write the second scanning line data into the scanning line data buffer and starting to output the written second scanning line data from the scanning line data buffer synchronously when the second scanning line data being written into the scanning line data buffer.

A method for processing display data in accordance with other exemplary embodiment of the present invention is provided. The method is adapted to a display having an image buffer and a scanning line data buffer. The image buffer includes a plurality of first-type memories. The method comprises: storing a first scanning line data in a first particular memory of the first-type memories; storing a second scanning line data in a second particular memory of the first-type memories; storing the first scanning line data of the first particular memory in the scanning line data buffer, and starting to output the first scanning line data from the scanning line data buffer after reading out completely the first scanning line data from the first particular memory; and storing the second scanning line data of the second particular memory in the scanning line data buffer, and outputting the second scanning line data from the scanning line data buffer synchronously when the second scanning line data start to be stored in the scanning line data buffer.

The present invention employs only two groups of memories in the image buffer to display normally images. Compared with the conventional arts which employ at least three groups of memories as the image buffer, the present invention can obviously decrease the amount of memory usage.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Reference will now be made to the drawings to describe exemplary embodiments of the present driving circuit, in detail. The following description is given by way of example, and not limitation.

Figure 1:
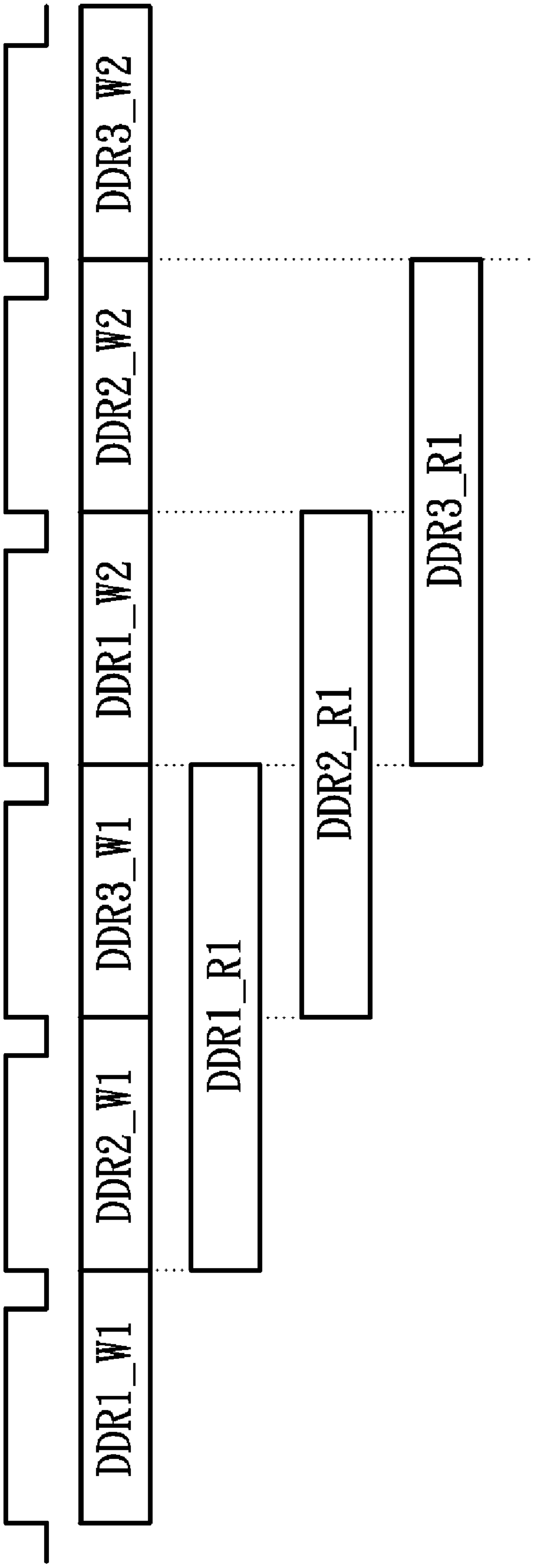
FIG. 1 (Prior Art)
FIG. 1 is a sequence diagram of a conventional method for processing display data.
Figure 2A:
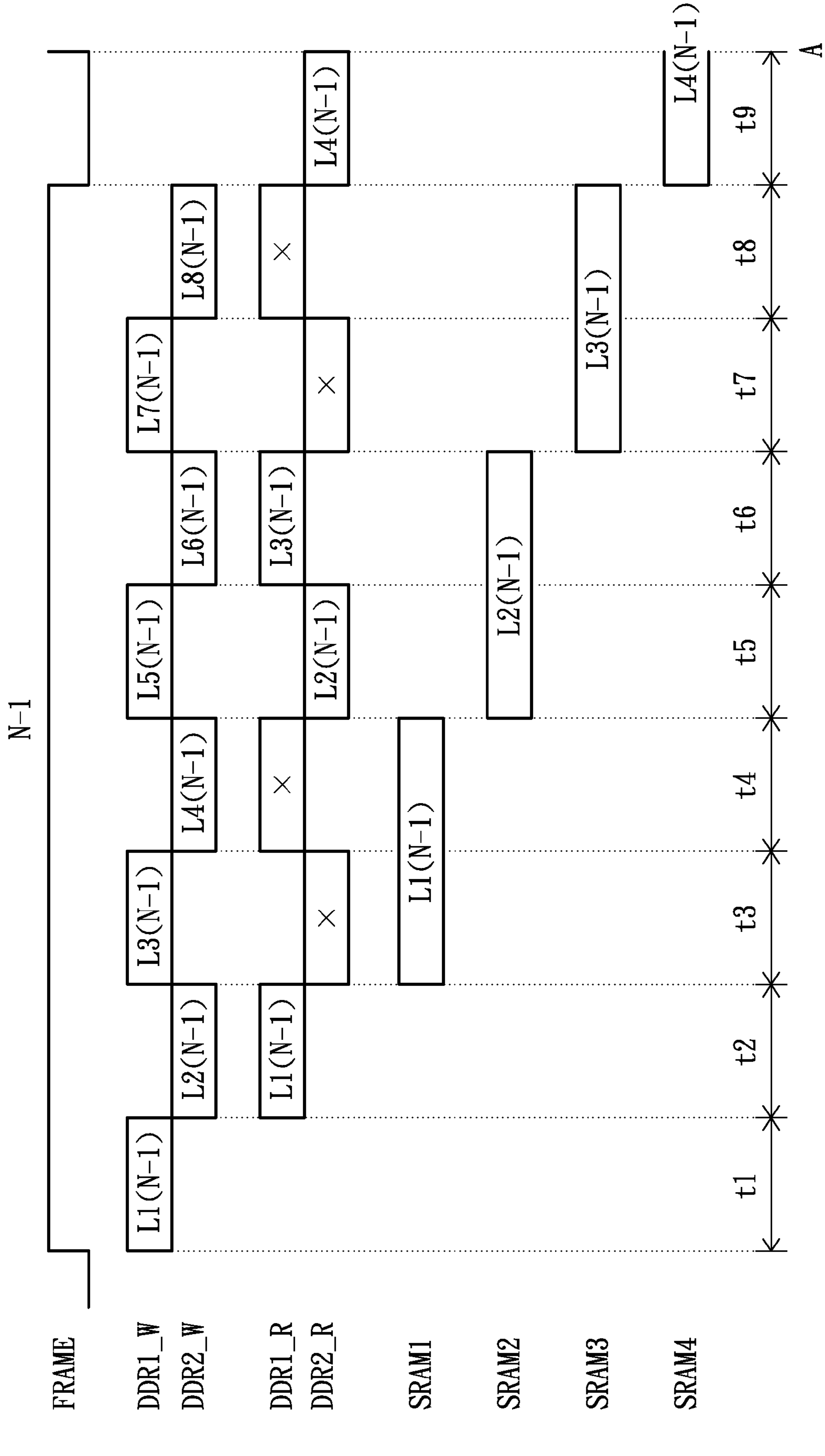
FIG. 2A and FIG. 2B are sequence diagrams of a method for processing display data, in accordance with an exemplary embodiment of the present invention.
Figure 2B:
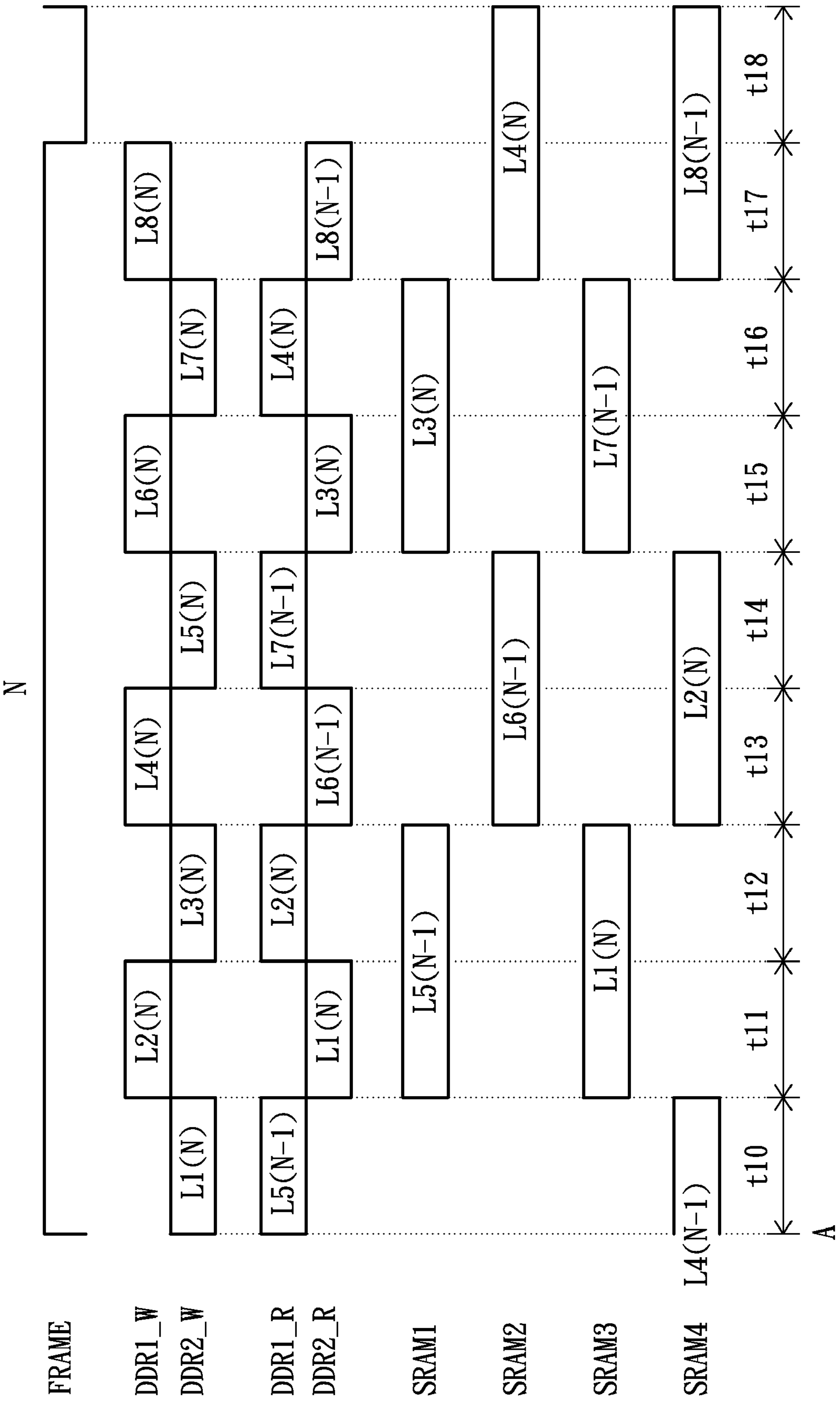

Referring to FIGS. 2A and 2B, a sequence diagram of a method for processing image data in accordance with an exemplary embodiment of the present invention, is provided. It should be noted, the exemplary embodiment employs scanning lines as processing units to process image data. Briefly speaking, current displays display the image data thereon in a sequence from left to right and from up to down, to form a whole image. Each line from left to right is called as a scanning line in this processing method. Therefore, the display data are composed of a plurality of frames of image data, and each frame of image data may be divided into a plurality of scanning line data. Each scanning line data is configured as data when a scanning line of an image is displayed. Furthermore, since the speed of inputting the image data is generally quicker than that of outputting the image data to be displayed, this exemplary embodiment employs two groups of double data rate random access memories (DDRRAM) as image buffers for receiving the image data, and four groups of static random access memories (SRAM) as scanning line data buffers when outputting the image data. In the present invention, DDRRAM may have a same operation frequency to that of SRAM. Alternatively, the operation frequency of DDRRAM can be larger than that of SRAM, but the amount of the input ports of SRAM is increased correspondingly to make the time period for reading the image data from DDRRAM be the same as that for writing the same image data into SRAM.

The following will explain the means of signs as shown in FIGS. 2A, 2B, and 4A to 4C. DDR1_W represents data written into the first group of DDRRAM, and following panes represent corresponding operations in corresponding time periods, such as written scanning line data. Signs indicated in the panes represent operated objects. For example, L1(N-1) represents the first scanning line data of the N-1 frame of the image data; L3(N) represents the third scanning line data of the N frame of the image data. Similar signs are adapted in DDR2_W (data written into a second group of DDRRAM), DDR1_R (data read from the first group of DDRRAM), DDR2_R (data read from the second group of DDRRAM) and SRAM1~4 (data read from the 1~4 groups of SRAM).

In this exemplary embodiment, each frame of image data includes eight scanning line data to describe the related technology of the present invention. This exemplary embodiment employs two groups of DDRRAM to receive each frame of image data. The scanning line data L1(N-1), L3(N-1), L5(N-1), L7(N-1), L2(N), L4(N), L6(N) and L8(N) are written into the first group of DDRRAM, and the scanning line data L2(N-1), L4(N-1), L6(N-1), L8(N-1), L1(N), L3(N), L5(N) and L7(N) are written into the second group of DDRRAM.

Time periods t1~t18 as shown in figures, have same time lengths. From figures, in the time period t1, the scanning line data L1(N-1) are written into the first group of DDRRAM. Next, in the following time period t2, the scanning line data L2(N-1) are written into the second group of DDRRAM. Orderly, the eight scanning line data of the N-1 frame of image data are stored into the two groups of DDRRAM respectively.

Figure 3:
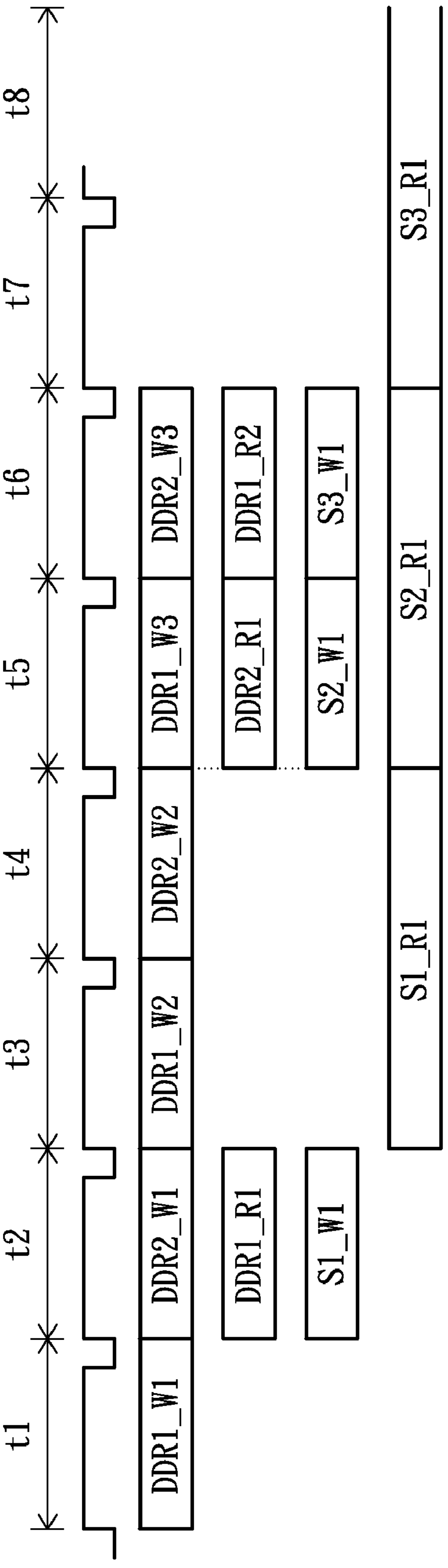
FIG. 3 is a detailed sequence diagram of the method for processing display data, in accordance with the exemplary embodiment of the present invention.

FIG. 3 is a sequence diagram of the method for processing display data in accordance with an exemplary embodiment of the present invention. After the scanning line data L1(N-1) are written into the first group of DDRRAM (DDR1_W1 as shown in FIG. 3), the scanning line data L1(N-1) are read out in the time period t2 (DDR1_R1 as shown in FIG. 3) and stored into the first group of SRAM (S1_W1 as shown in FIG. 3) of the scanning line data buffer. The first group of SRAM receives the scanning line data L1(N-1) in the time period t2, and outputs the scanning line data L1(N-1) to be displayed (S1_R1 as shown in FIG. 3) in the time periods t3 and t4 (assuming the speed for inputting the image data is double that for outputting the image data). The scanning line data L1(N-1), L3(N-1), L5(N-1) and L7(N-1) for the odd scanning lines of the N-1 frame of the image data are processed by the above mode, and are outputted to be displayed after the scanning line data are completely written into the SRAM. The difference in processing the odd scanning lines in the N-1 frame is using different SRAM, thus the processing mode for the other odd scanning lines is not described.

Referring to FIGS. 2A, 2B and 3, from another aspect, the scanning line data L2(N-1) are written into the second group of DDRRAM (DDR2_W1 as shown in FIG. 3) in the time period t2. Next, the scanning line data L2(N-1) are read out (DDR2_R1 as shown in FIG. 3) from the second group of DDRRAM in the time period t5. The scanning line data L2(N-1) read from the second group of DDRRAM are written into another group (defined as the second group) of SRAM (S2_W1 as shown in FIG. 3) in the time period t5. Different from the mode of processing the odd scanning lines data, the scanning line data L2(N-1) are read out from the second group of SRAM to be displayed (S2_R1 as shown in FIG. 3) when being written into the second group of SRAM. However, because of the limitation of the speed for outputting, the operating time for outputting the scanning line data L2(N-1) from the second group of SRAM includes the two time periods t5 and t6. Similarly, the scanning line data L2(N-1), L4(N-1), L6(N-1) and L8(N-1) for the even scanning lines of the N-1 frame of the image data are processed substantially by the above mode, and are outputted to be displayed when the scanning line data are written into the SRAM. The difference in processing the even scanning lines in the N-1 frame is using different SRAM, thus the processing mode for the other even scanning lines is not described.

The key of the method of this exemplary embodiment is that because the DDRRAM cannot be written and read synchronously, the scanning line data should be read when the DDRRAM is in the non-writing condition. Furthermore, each scanning line data of a same frame of image data must be linked and not overlapped with the above scanning line data thereof when being outputted for being displayed, such that the images are linked smoothly. Therefore, after one odd scanning line data are outputted to the SRAM from the DDRRAM, the next scanning line data of the same frame of the image data are outputted to the SRAM from the DDRRAM after two time periods. Oppositely, after one even scanning line data are outputted to the SRAM from the DDRRAM, the next scanning line data of the same frame of the image data are outputted to the SRAM from the DDRRAM in the next time period. For example, the scanning line data L1(N-1) are displayed in the time periods t3 and t4; the scanning line data L2(N-1) are displayed in the time periods t5 and t6; the scanning line data L3(N-1) are displayed in the time periods t7 and t8; the scanning line data L4(N-1) are displayed in the time periods t9 and t10, and so on. The N-1 frame of image data finish to be displayed after the scanning line data L8(N-1) are displayed in the time period t17 and t18.

Please return to FIGS. 2A and 2B, the method for processing the scanning line data L1(N), L2(N) . . . L8(N) of the N frame of image data is similar to the method for processing the scanning line data L1(N-1), L2(N-1) . . . L8(N-1) of the N-1 frame of image data, except that the odd scanning line data of the N frame of image data are stored into the second group of DDRRAM, and the even scanning line data thereof are stored into the first group of DDRRAM. Similarly, the scanning line data (the even scanning line data, such as the scanning line data L2(N) and L4(N)) stored into the first group of DDRRAM are displayed after being completely written into the SRAM. The scanning line data (the odd scanning line data, such as the scanning line data L1(N) and L3(N)) stored into the second group of DDRRAM are displayed at the same time of being written into the SRAM.

Figure 4A:
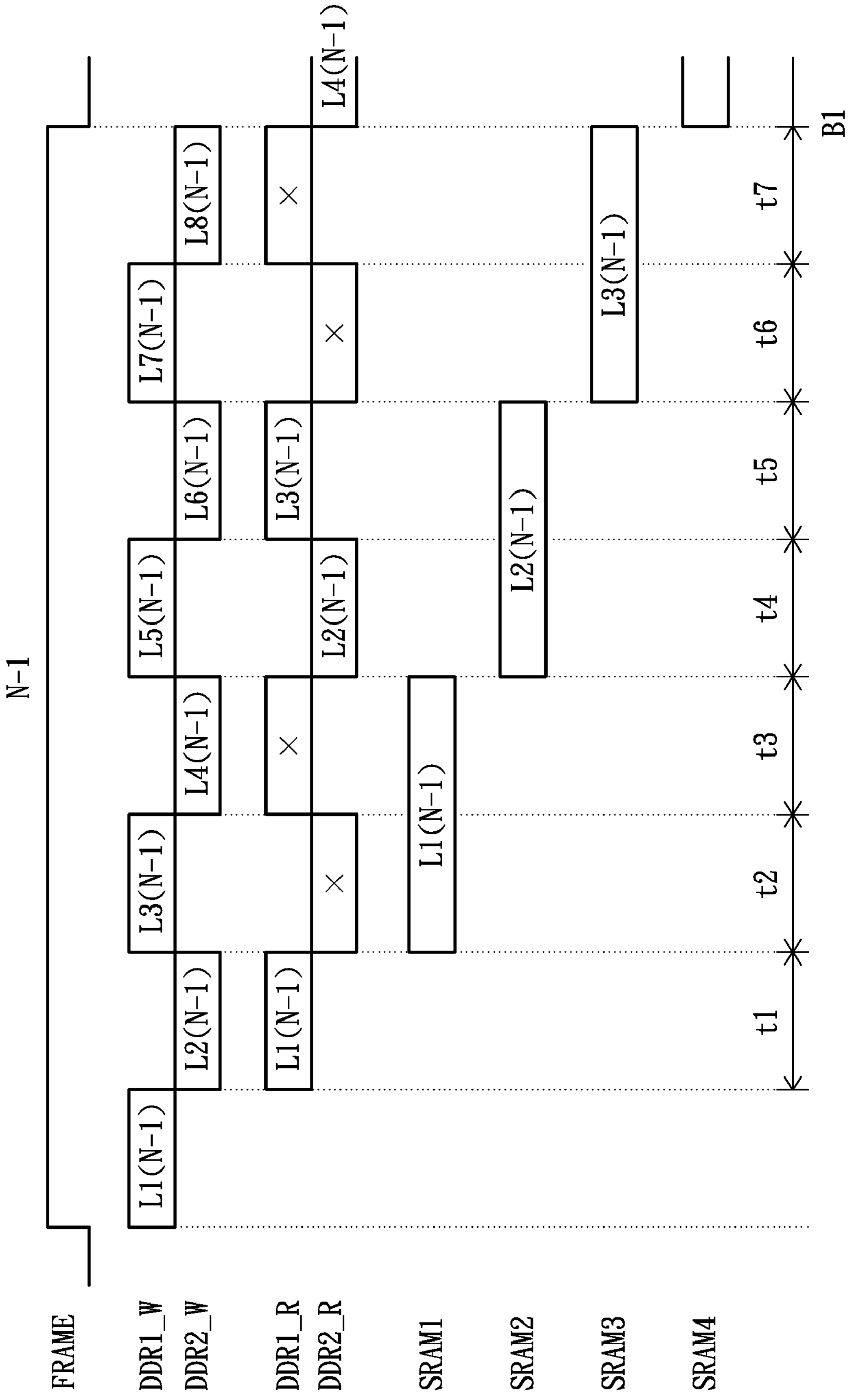
FIG. 4A to FIG. 4C are sequence diagrams of a method for processing display data, in accordance with another exemplary embodiment of the present invention.
Figure 4B:
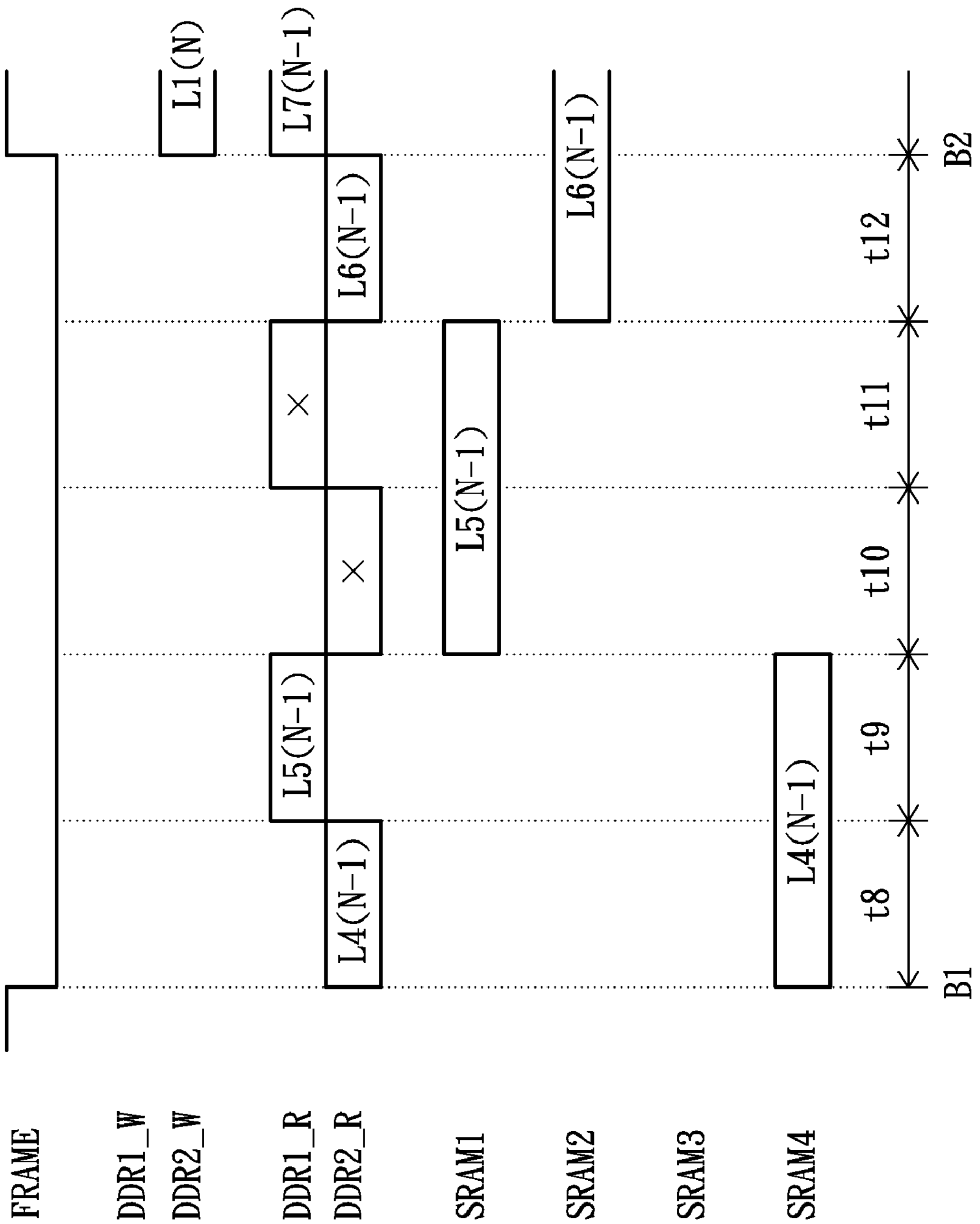
Figure 4C:
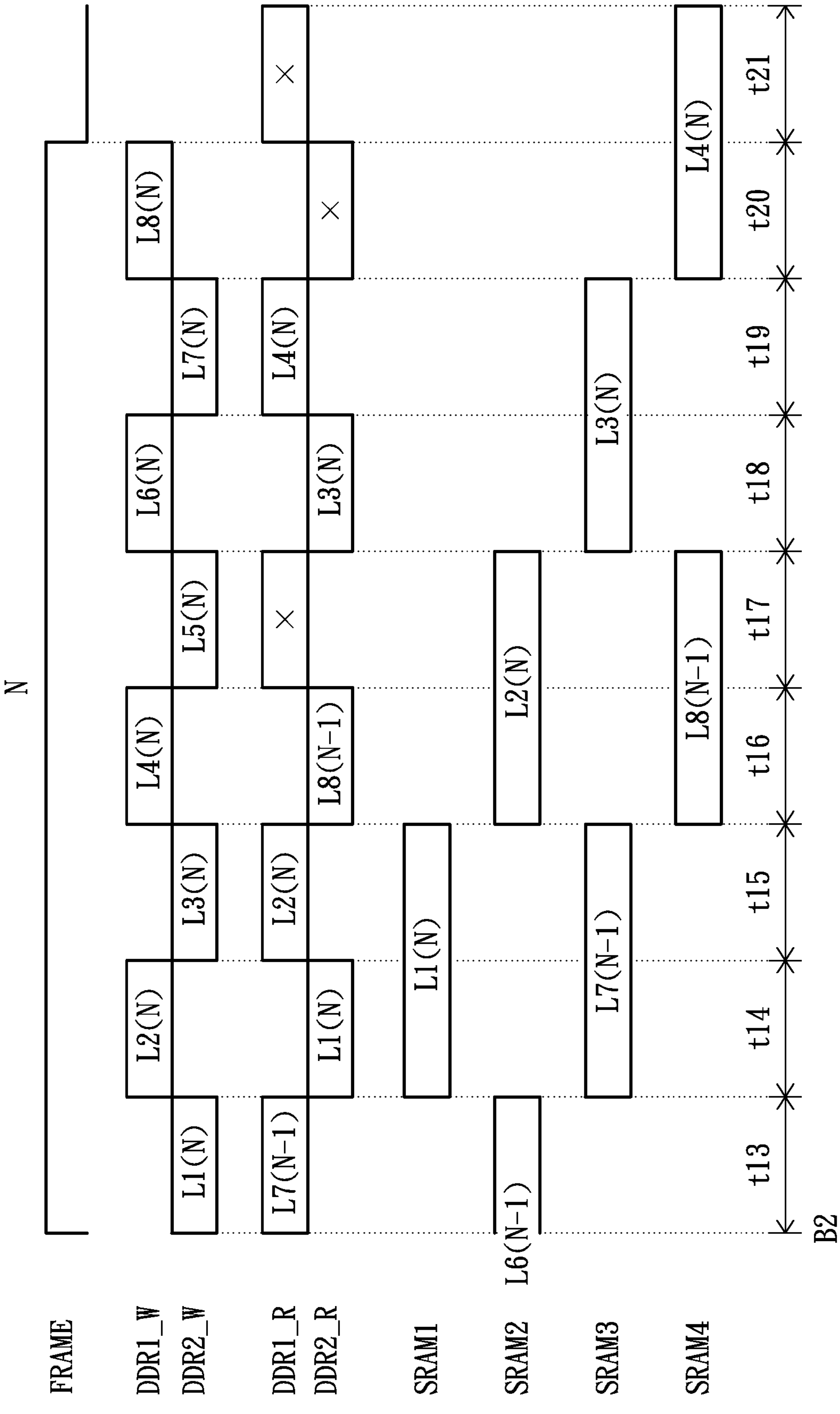

Referring to FIGS. 4A to 4C, sequence diagrams of a method for processing display data in accordance with another exemplary embodiment of the present invention are provided. The method for processing each frame of image data in this exemplary embodiment is similar to that as shown in FIGS. 2A and 2B, except that a blanking period of this exemplary embodiment has a different time length. However, from the FIGS. 4A to 4C, it is known that the method of this exemplary embodiment can be adapted to display systems have blanking periods with different time lengths. It should be noted that, although the present invention writes the scanning line data into the first group of DDRRAM as a start, the start may be writing the scanning line data into the second group of DDRRAM. Various changes can be made obviously from the above embodiments and the description, thus they are not described in following.

From the embodiments as shown in FIGS. 2A to 2B and 4A to 4C, it is known that the method for processing display data provided by the present invention can be operated no matter which group of DDRRAM do the scanning line data start to be written into, if the time lengths of the blanking periods, such as the time period t9 and t 18 as shown in FIGS. 2A and 2B or the time periods t8~t12 as shown in FIGS. 4A to 4C, are integer times as the time period for the DDRRAM reading/writing one scanning line data.

Figure 5:
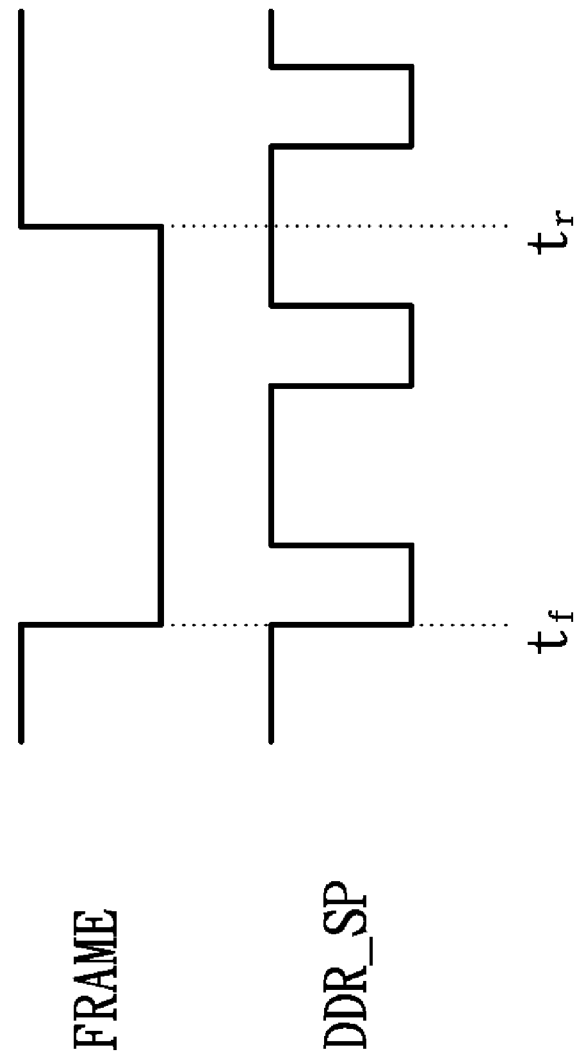
FIG. 5 is a sequence relation diagram between an original blanking period of a display system and a time for DDRRAM processing a scanning line data.

However, there are not all display systems having blanking periods which have the time lengths integer times as the time for the DDRRAM reading/writing one scanning line data. Thus the time lengths of the blanking periods should be adjusted in some conditions. The present invention adjusts the blanking periods according to the time for processing the scanning line data directly. Referring to FIG. 5, a sequence relation diagram between an original blanking period of the display system and the time for DDRRAM processing one scanning line data is provided. From FIG. 5, the original blanking period (from a time point tf to a time point tr) is substantially equal to one and a half time period for processing the scanning line data (DDR_SP). To adjust the original blanking period to have a suitable length, after starting the original blanking period (the time point tf), the image data of the next frame start to be processed after take count of a suitable amount of DDR_SP forcedly. Therefore, the time point tf is delayed suitably to fit the present invention. Alternatively, the data stored in the SRAM are properly output to adjust the blanking period between the two frames, such that the blanking period between the two frames are adjusted to be integer times as the time for displaying each scanning line data. For example, image data that are to be shown on an area that cannot be seen by the users are partially or repeatedly output from the SRAM such that blanking period between the two frames can be adjusted.

From the above, the method for processing display data of the present invention employs only two groups of DDRRAM in the image buffer to display normally images. Compared with the conventional arts which employ at least three groups of DDRRAM as the image buffer, the present invention can increase the memory elements.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for processing display data, the method being adapted to a display to scan a plurality of scanning lines just one time for displaying a frame of an image data, the image data comprising a plurality of scanning line data, and each scanning line data being configured for displaying on one corresponding scanning line, the method comprising:

storing the image data in a plurality of first-type memories by taking one scanning line data as an unit;

providing one of the scanning line data stored in a particular memory of the first-type memories to one of a plurality of second-type memories, the particular memory being one of the first-type memories which is not receiving and storing the image data; and outputting the scanning line data stored in the second-type memories, time periods for outputting the scanning line data from the second-type memories being not overlapped;

wherein blanking period between two frames is integer times of the period of displaying any one of the scanning line data.

2. The method as claimed in claim 1, wherein the step of providing one of the scanning line data stored in the particular memory of the first-type memories to one of a plurality of second-type memories, comprises:

providing the scanning line data in sequence; and providing no more than two of the scanning line data consecutively and then starting to provide another one of the scanning line data after a predetermined time period.

3. The method as claimed in claim 2, wherein the step of providing no more than two of the scanning line data consecutively and then starting to provide another one of the scanning line data after the predetermined time period, comprises:

starting to provide a first scanning line data stored in a first particular memory of the first-type memories to a first particular memory of the second-type memories at a first time; and after the first scanning line data are provided completely to the first particular memory of the second-type memories, starting to provide a second scanning line data stored in a second particular memory of the first-type memories to a second particular memory of the second-type memories after the predetermined time period.

4. The method as claimed in claim 2, wherein the step of providing no more than two of the scanning line data consecutively and then starting to provide another one of the scanning line data after the predetermined time period, comprises:

starting to provide a first scanning line data stored in a first particular memory of the first-type memories to a first particular memory of the second-type memories at a first time;

after the first scanning line data are provided completely to the first particular memory of the second-type memories, starting immediately to provide a second scanning line data stored in a second particular memory of the first-type memories to a second particular memory of the second-type memories; and after the second scanning line data are provided completely to the second particular memory of the second-type memories, starting to provide a third scanning line data stored in the first-type memories to a third particular memory of the second-type memories after the predetermined time period.

5. The method as claimed in claim 1, wherein the step of outputting the scanning line data stored in the second-type memories, time periods for outputting the scanning line data of the image data from the second-type memories being not overlapped, comprises:

for some of the second-type memories, outputting the stored scanning line data after the scanning line data being completely stored into the second-type memories; and for others of the second-type memories, outputting the stored scanning line data at the same time of receiving them.

6. The method as claimed in claim 5, wherein the outputting periods of the scanning line data from the second-type memories are consecutive.

7. The method as claimed in claim 1, further comprising:

adjusting the blanking period between the two frames, to ensure the blank period integer times of the period of displaying any one of the scanning line data.

8. The method as claimed in claim 1, wherein an operation frequency of the first-type memories is higher than that of the second-type memories.

9. The method as claimed in claim 1, wherein the first-type memories employ two independent operational memories, the second-type memories employ four independent operational memories.

10. A method for processing display data, the method being adapted to a display having an image buffer and a scanning line data buffer, the image buffer including a plurality of first-type memories, the scanning line data buffer including a plurality of second-type memories, the method comprising:

a). storing a first scanning line data in a first particular memory of the first-type memories;

b). storing a second scanning line data in a second particular memory of the first-type memories;

c). providing the first scanning line data from the first particular memory of the first-type memories to a first particular memory of the second-type memories;

d). providing the second scanning line data from the second particular memory of the first-type memories to a second particular memory of the second-type memories; and e). when the first scanning line data and the second scanning line data are included in the same frame, outputting the first scanning line data stored in the first particular memory of the second-type memories and then outputting the second scanning line data stored in the second particular memory of the second-type memories such that the outputting periods of the first scanning line data and the second scanning line are not overlapped;

wherein blanking period between two frames is integer times of the period of displaying any one of the scanning line data.

11. The method as claimed in claim 10, wherein the step d) is performed after a predetermined time period since the step c is completely performed.

12. The method as claimed in claim 11, wherein the step e) comprises:

outputting the first scanning line data after the first particular memory of the second-type memories receives completely the first scanning line data; and outputting the second scanning line data while the second particular memory of the second-type memories receiving the second scanning line data.

13. The method as claimed in claim 10, wherein the step e) comprises:

outputting the first scanning line data after the first particular memory of the second-type memories receives completely the first scanning line data; and outputting the second scanning line data while the second particular memory of the second-type memories receiving the second scanning line data.

14. The method as claimed in claim 10, wherein the outputting periods of the first scanning line data and the second scanning line data are consecutive.

15. The method as claimed in claim 10, further comprising: adjusting the blanking period between the two frames, to ensure the blank period integer times of the period of displaying any one of the scanning line data.

16. The method as claimed in claim 10, wherein an operation frequency of the first-type memories is higher than that of the second-type memories.

17. The method as claimed in claim 10, wherein the first-type memories employ two independent operational memories, the second-type memories employ four independent operational memories.

18. The method as claimed in claim 10, wherein the first scanning line data stored in the first particular memory of the second-type memories and the second scanning line data stored in the second particular memory of the second-type memories are able to be outputted synchronously when the first scanning line data and the second scanning line data are included in different frames.

19. A method for processing display data, the method being adapted to a display having an image memory buffer and a scanning line data memory buffer, the method comprising:

a). storing a first scanning line data and a second scanning line data in the image memory buffer;

b). reading out the first scanning line data from the image memory buffer in a first time period, and starting to write the first scanning line data into the scanning line data memory buffer in the first time period;

c). outputting the first scanning line data from the scanning line data memory buffer in a second time period; and d). reading out the second scanning line data from the image memory buffer in a third time period, starting to write the second scanning line data into the scanning line data memory buffer and starting to output the written second scanning line data from the scanning line data memory buffer synchronously when the second scanning line data are written into the scanning line data memory buffer;

wherein blanking period between two frames is integer times of the period of displaying any one of the scanning line data.

20. A method for processing display data, the method being adapted to a display having an image buffer and a scanning line data buffer, the image buffer including a plurality of first-type memories, the method comprising:

storing a first scanning line data in a first particular memory of the first-type memories;

storing a second scanning line data in a second particular memory of the first-type memories;

storing the first scanning line data from the first particular memory into the scanning line data buffer, and starting to output the first scanning line data from the scanning line data buffer after reading out completely the first scanning line data from the first particular memory; and storing the second scanning line data from the second particular memory into the scanning line data buffer, and outputting the second scanning line data from the scanning line data buffer synchronously when the second scanning line data start to be stored in the scanning line data buffer;

wherein blanking period between two frames is integer times of the period of displaying any one of the scanning line data.

* * * * *